(12) United States Patent
Morris

(10) Patent No.: US 6,988,443 B2
(45) Date of Patent: Jan. 24, 2006

(54) AIR BRAKE ACTUATOR ASSEMBLY

(75) Inventor: Royston Leonard Morris, Rogerstone (GB)

(73) Assignee: Meritor Heavy Vehicle Braking Systems (UK) Limited, Gwent (GB)

(*) Notice: Subject to any disclaimer, the term of this patent is extended or adjusted under 35 U.S.C. 154(b) by 37 days.

(21) Appl. No.: 10/855,858

(22) Filed: May 27, 2004

(65) Prior Publication Data
US 2004/0250679 A1 Dec. 16, 2004

(30) Foreign Application Priority Data
May 30, 2003 (GB) .................................. 0312459

(51) Int. Cl.
B60T 17/08 (2006.01)
(52) U.S. Cl. ........................................ 92/98 R; 164/98
(58) Field of Classification Search ................ 92/98 R, 92/138; 188/170, 71.1; 29/527.5; 164/98–112
See application file for complete search history.

(56) References Cited

U.S. PATENT DOCUMENTS

| 5,168,964 | A  | * | 12/1992 | Shimmell ................... 188/72.4 |
| 6,220,401 | B1 | * | 4/2001  | Roberts et al. ............ 188/72.9 |
| 6,234,587 | B1 | * | 5/2001  | Gerum et al. ................ 188/170 |
| 6,755,233 | B2 | * | 6/2004  | Fisher .......................... 164/98 |

FOREIGN PATENT DOCUMENTS

| DE | 12 42 421 B   | 6/1967  |
| DE | 41 35 943 A1  | 5/1993  |
| EP | 0 510 930 A1  | 10/1992 |
| GB | 2 001 564 A   | 2/1979  |
| JP | 8035530       | 2/1996  |
| WO | WO 98/26968 A | 6/1998  |

OTHER PUBLICATIONS

Search report, dated Nov. 25, 2003.
European Search Report, Sep. 8, 2004.

* cited by examiner

Primary Examiner—Thomas E. Lazo
(74) Attorney, Agent, or Firm—Carlson, Gaskey & Olds

(57) ABSTRACT

An air brake actuator assembly includes a pre-formed air chamber component and a cast brake housing. A portion of the cast brake housing is cast around a portion of the air chamber component. This securely attaches the air chamber component to the cast brake housing without requiring additional fastening structures.

18 Claims, 3 Drawing Sheets

AIR BRAKE ACTUATOR ASSEMBLY

REFERENCE TO RELATED APPLICATIONS

The present invention claims the benefit of United Kingdom (GB) Patent Application No. 0312459.1, filed May 30, 2003.

TECHNICAL FIELD

The present invention relates to an air brake actuator assembly. More particularly, the invention relates to an air brake actuator assembly for an air actuated disc brake used in a heavy vehicle, such as a truck or bus.

BACKGROUND OF THE INVENTION

An air brake actuator assembly is often used in a wheel of a vehicle, especially in the wheel of a heavier vehicle, such as a truck or bus. The air brake actuator assembly usually includes a cast iron brake housing with an air chamber. The air chamber is typically made of mild steel (i.e., low-carbon steel) and comprises a front shell and a rear shell that are attached to each another to form an airtight seal. The front shell is attached to a flange of a brake housing, typically by screws, to form a weather-tight seal. The weather-tight seal is necessary to prevent water or other foreign matter, such as brake dust or dirt, from entering the air chamber. The air chamber contains a piston connected to a brake actuator by a suitable linkage.

Pressurized air is introduced behind a diaphragm of the piston, which generates a load in a push rod. The push rod in turn applies a force to a pivotally mounted operating shaft, causing it to rotate. An amplified force is applied to one or more adjustable tappet assemblies via eccentric action. This amplified force advances a brake pad toward a brake rotor. The brake pad causes the rotor to restrict rotation due to friction generated through contact between the brake pad and the tappet and through contact with a further brake pad mounted on the opposite face of the rotor.

WO-A-98026968 discloses a brake assembly comprising a cast brake housing that incorporates a cast air chamber. The air chamber is closed by a lid, which is made of mild steel. The lid and the air chamber are attached to each another using a suitable fastening means to form an airtight seal therebetween.

Known brake assemblies having a separate air chamber screwed to the housing experience a number of disadvantages. For example, screwing the front shell to the flange of the brake housing requires additional machining, parts and labor, thereby increasing the total cost of the finished brake assembly. Moreover, the weather-tight seal between the brake housing and the front shell introduces further complexity into the assembly. The flange adds mass to the brake assembly and reduces the available space around the brake assembly, thereby limiting design flexibility for other components near the brake assembly.

The cast brake housing shown in WO-A-98026968 overcomes some of these problems, but it introduces its own problems by increasing the mass of the brake assembly. This is undesirable because the brake assembly is an unsprung mass, which should be minimized to achieve optimum response of the vehicle suspension. The wall thickness of the cast air chamber could be reduced to reduce the mass of the brake assembly; however, this would not be desirable because castings do not perform well in tension. Thus, reducing the wall thickness would reduce the resistance of the cast air chamber to impact damage. The requirement for the mild steel lid to close the cast air chamber requires a different joining method, which may add further cost to the finished brake assembly.

EP0510930 shows a hydraulic brake caliper having a prefabricated cast-in-place cylinder bore liner. The liner is made from steel and the caliper body is made from aluminum. However, the problem being addressed here is to provide a lightweight caliper that nevertheless has a cylinder bore liner with good machineability and wear properties. This is in contrast to one of the problems addressed by the present invention, which is to provide an alternative attachment method of an air chamber component to a brake housing.

SUMMARY OF THE INVENTION

The invention is directed to a brake assembly that eliminates the need to attach the air chamber to the brake housing after casting of the brake housing. The inventive brake assembly includes a mechanical joint made between the air chamber and the brake housing during manufacturing of the brake assembly. The mechanical joint eliminates the need to provide a flange for attaching the air chamber with screw fixings. This reduces the weight of the undamped mass of the brake assembly when compared to currently-known brake assemblies. Eliminating the flange increases the available space around the brake assembly, which is advantageous from a design point of view. The joint between the air chamber and the brake housing is inherently weather-tight, which eliminates the need to provide a separate sealing arrangement.

The air chamber component may include a front shell. The brake assembly may further include a rear shell fixed to the front shell by any desired fastening method, such as clamping or crimping, to form an air chamber. For an air chamber made from steel, for example, the fastening method used to join the front and rear shells can be entirely conventional, thus ensuring reliability and allowing the use of existing components. This further contributes to cost and inventory reductions.

In one embodiment, a form locking profile of the air chamber component comprises a flange of the air chamber component. The flange may be radially inwardly directed and may be continuous.

The form locking profile may be formed through openings of the air chamber component. The form locking profile may have a discontinuous profile, such as an outwardly directed bulge. Alternatively, the form locking profile may extend continuously around the circumference of the component or may extend only intermittently.

The invention is also directed to a method of manufacturing a brake assembly that includes chilling the air chamber before casting the air chamber in the brake housing. This reduces the chance of softening of the air chamber as the casting is poured. Pre-chilling may also improve the dimensional tolerance of the finished brake actuator assembly.

BRIEF DESCRIPTION OF THE DRAWINGS

The invention will now be described, by way of example only, with reference to the accompanying drawings in which.

DETAILED DESCRIPTION OF THE EMBODIMENTS

Figure 1:
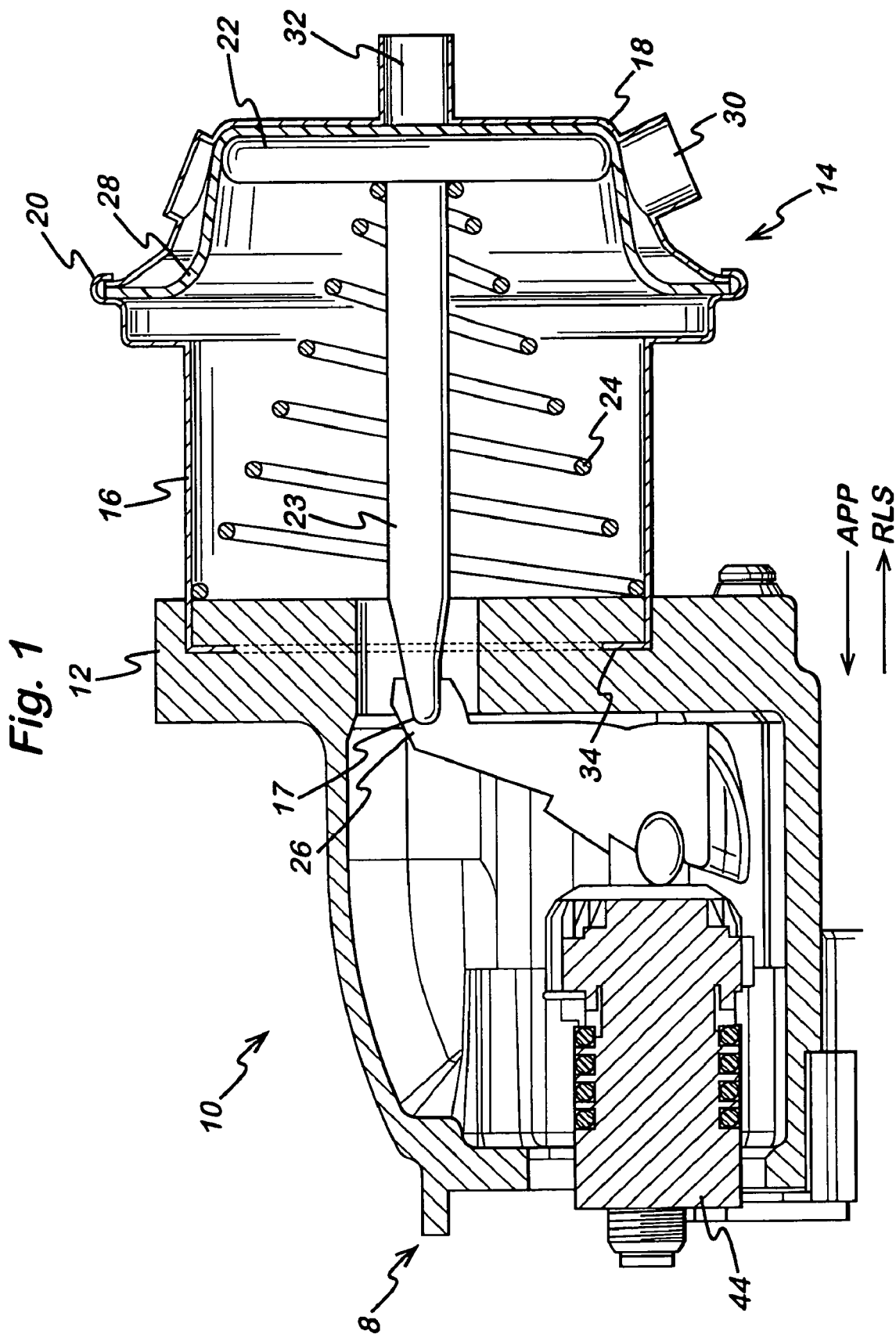
FIG. 1 is a representative cross-section of an air brake actuator assembly according to the present invention.

FIG. 1 is a representative cross section of an air brake actuator assembly 10 in accordance with one embodiment of the present invention. The air brake actuator assembly 10 comprises a brake housing 12, which may be cast from iron or other material, and a substantially cylindrical steel air chamber 14. The air chamber 14 comprises a front shell 16 and a rear shell 18, both of which may be made as steel pressings. The front shell 16 and the rear shell 18 are joined together at a crimping point 20. The rear shell 18 is also referred to in this specification as a closing component because it substantially closes the open end of the front shell 16. The air chamber 14 houses a piston 22 that is resiliently biased toward the rear shell 18 by a return spring 24. The piston 22 has an arm or push rod 23 that passes through an opening in the brake housing 12 to connect with a pivot arm or operating shaft 26. The operating shaft 26 operates a brake rotor (not shown).

The specific details of the brake operating mechanism are known in the art and will not be included here. Generally, the brake 8 includes a caliper housing that straddles a disc or rotor (not shown). The caliper is typically mounted on an axle of the vehicle to be braked (not shown) and is slideable longitudinally relative to the axle. The rotor is mounted for rotation together with a wheel of the vehicle. The brake 8 is actuated by introducing pressurized air behind a diaphragm 28 of the air chamber 14. The diaphragm 28 is connected to the push rod 23, which cooperates with a socket 17 at the radial outer end of the operating shaft 26 of the brake 8. The operating shaft 26 is generally "T" shaped.

As shown in FIG. 1, the lower end of the operating shaft 26 has arcuate bearing surfaces at its opposite ends. The arcuate bearing surfaces are seated in bearing seats arranged at the lower end of the brake housing 12 to permit the operating shaft 26 to rotate about an axis. The lower end of the operating shaft 26 is further provided with pockets (not shown) positioned eccentrically to the axis of rotation of the operating shaft 26. Upon rotation of the operating shaft 26, the pockets cause a force to be transmitted to a pair of spaced adjustable tappet assemblies 44. The tappet assemblies 44 apply the input load from the air brake actuator assembly 10 to a rear face of an inner brake pad (not shown), thereby pressing the friction material of the brake pad into frictional engagement with the rotor.

The frictional engagement between the rotor and the inner brake pad generates a reaction force. This reaction force is fed back through the tappet assemblies 44 and the operating shaft 26. As shown in FIG. 1, the operating shaft 26 is supported by the brake housing 12. The brake housing 12 is secured to an outer housing part (not shown). Thus, the applied force generated by movement of the operating shaft 26 is ultimately transmitted by the reaction force to the outer housing part. The reaction force in turn presses an outer brake pad (not shown) into frictional engagement with the rotor. Therefore, when the operating shaft 26 moves in an application direction APP, the rotor is clamped between the inner and outer brake pads to generate a braking force for service braking the vehicle under control of the applied input movement from the push rod 23. Release of air pressure from the air chamber 14 will cause the push rod 23 to move in a release direction RLS under the action of the return spring 24.

The tappet assemblies 44 may be adjustable to compensate for wear in the friction material of the brake pads. U.S. Pat. No. 6,435,319 contains a further explanation of the service operation of the brake 8 and shows a similar brake and the service operation thereof.

The diaphragm 28 separates the front shell 16 and the rear shell 18. The diaphragm 28 is secured to the air chamber 14 at the crimping point 20. The piston 22 and the spring 24 are located on one side of the diaphragm 28. The rear shell 18 is provided with air inlets 36, 32, which are in fluid communication with the other side of the diaphragm 28. The front shell 16 is secured to the brake housing 12 by a radially inwardly directed flange 34 of the front shell 16, which is molded into the cast brake housing 12 during casting thereof.

Figure 2:
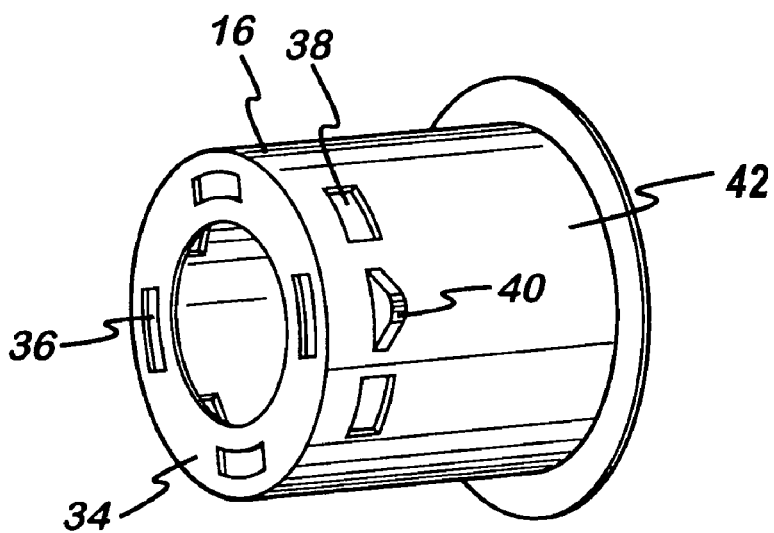
FIG. 2 is a representative diagram of a front shell of an air chamber illustrated in FIG. 1.

FIG. 2 is a diagrammatic representation of the front shell 16 of the air chamber 14 illustrated in FIG. 1. The front shell 16 includes a generally cylindrical body portion 46. In FIG. 2, the flange 34 is shown with openings 36, which permit the molten cast iron forming the brake housing 12 to flow through the front shell 16 during casting of the brake housing 12. The openings 36 provide additional strength and retention of the front shell 16 in the brake housing 12. Also shown in FIG. 2 is an optional rib 42 on the outer surface of the front shell 16, which provides further retention of the front shell 16 in the casting forming the brake housing 12.

Figure 3:
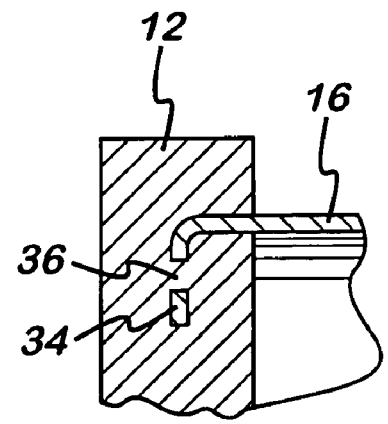
FIG. 3 is a representative cross-section of a casting detail of the assembly of FIG. 1.
Figure 4:
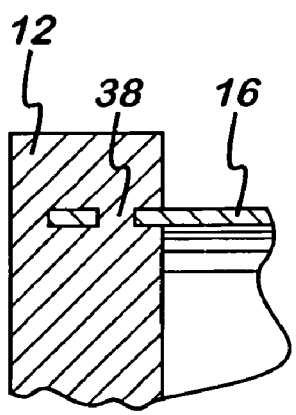
FIG. 4 is a representative cross-section of a casting detail of the assembly of FIG. 1 according to an alternative embodiment.
Figure 5:
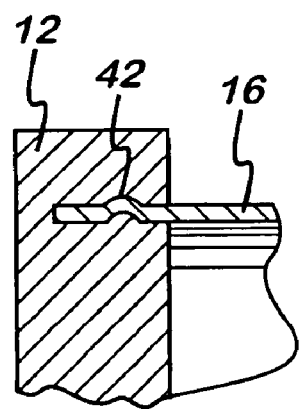
FIG. 5 is a representative cross-section of a casting detail of the assembly of FIG. 1 according to yet a further embodiment.

FIGS. 3 through 5 are representative cross-sections of various alternative embodiments of a casting detail of the brake assembly of FIG. 1. FIG. 3 shows the flange 34 with an opening 36. FIG. 4 shows an opening 38 in a side wall of the front shell 16. FIG. 5 shows an alternative arrangement where the rib 42 is provided around a portion of or around a full circumference of the front shell 16. The flange 34, the rib 42 and the openings 36, 38 all act as form-locking profiles that provide mechanical attachment of the front shell 16 to the brake housing 12.

The front shell 16 can be fully formed before casting of the brake housing 12 to avoid any subsequent machining or forming operations. The brake housing 12 may be machined to its finished form in a conventional manner.

During manufacture of the brake actuator assembly 10, the brake housing 12 is cast around the front shell 16. The front shell 16 can be chilled before the casting process to help maintain the dimensional tolerances and integrity of the front shell 16. The benefits of producing a brake actuator assembly 10 in this manner include reduced weight of the brake actuator assembly 10 and improved strength and sealing of the front shell 16 with the brake housing 12. Furthermore, the inventive brake actuator assembly 10 reduces the labor needed to build the assembly as well as associated assembly and manufacturing costs.

It will be appreciated that the casting method described above can be used to join both similar and dissimilar materials for the air chamber 14 and the brake housing 12. This flexibility in the material selection provides further advantages in the characteristics of the brake actuator assembly 10. For example, it is possible to use different materials for the brake housing 12 and the air chamber 14, such as aluminum or different grades of iron. Alternatively, cast steel can be used in the brake housing 12.

Various attachment methods can be used to secure the front shell 16 to the rear shell 18. A part of the front shell 16 can be locally crimped at circumferentially discrete locations onto the rear shell 18. Alternatively, a rim of front shell 16 can be rolled around a rim of the rear shell 18 (i.e. the rim rolling is carried out through 360 degrees of the rim to secure the front shell 16 and the rear shell 18 through a complete 360 degree circumference). In a similar manner, a part of the rear shell 18 can be locally crimped at circumferentially discrete locations onto the front shell 16, or alternatively a rim of the rear shell 18 can be rolled around a rim of the front shell 16. Discrete clamping bands may be used to clamp a rim of the front shell 16 to a rim of the rear shell 18. Rims of the front and rear shells 16, 18 can be welded together, either at circumferentially discrete locations or through a full 360 degree circumference.

In summary, the present invention attaches the front shell 16 to the rear shell 18 without requiring any specific attachment features in the front shell 16 to secure it to the brake housing.

Figure 6:
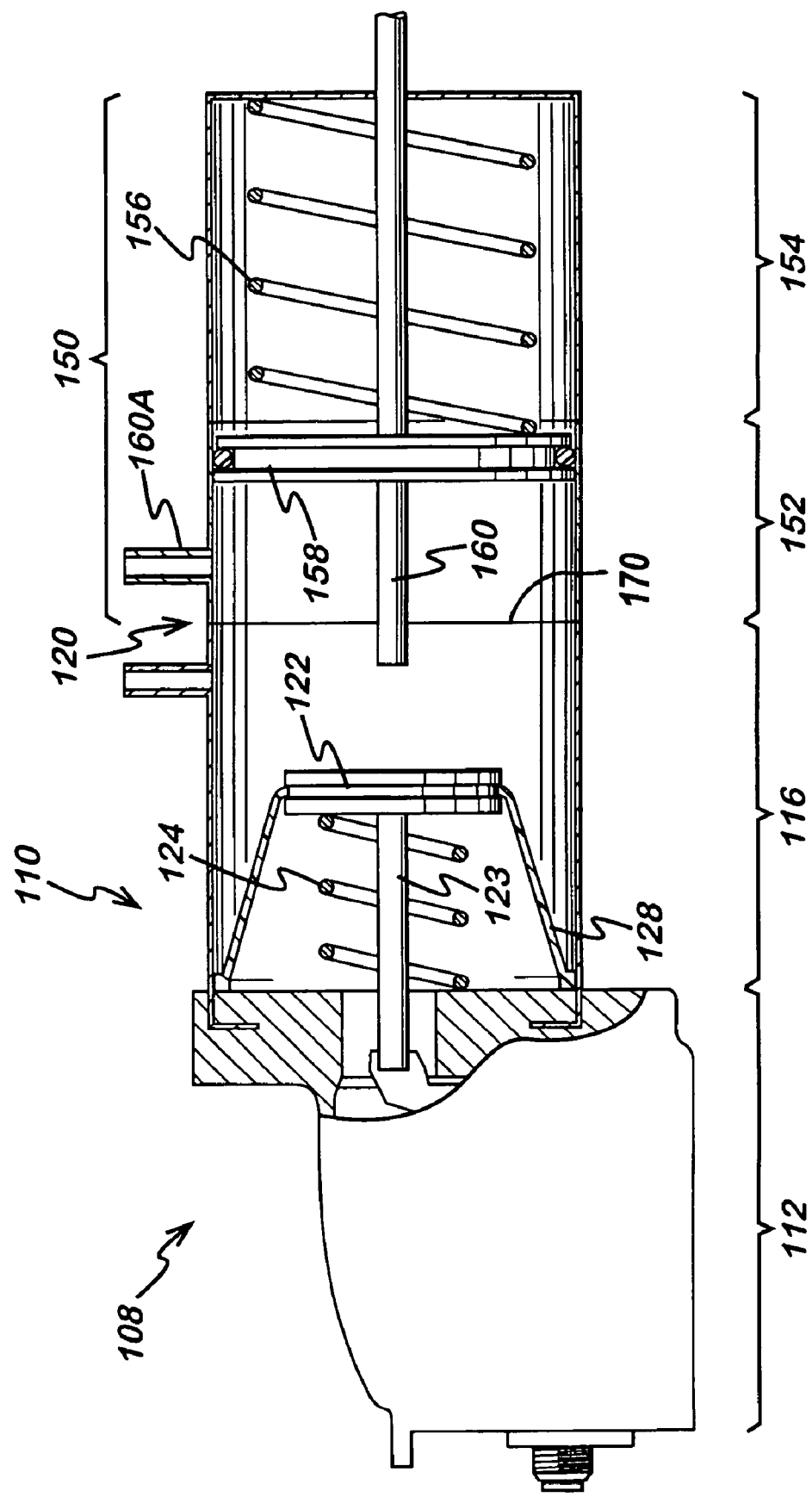
FIG. 6 is a representative cross section of a further embodiment of an air brake actuator assembly according to the present invention.

FIG. 6 shows another example of a brake 108 having a brake actuator assembly 110 according to the present invention. In this example, the brake 108 can be used both in a service mode and as a parking brake. In this example, a brake housing 112, a front shell 116, a diaphragm 128, a spring load 124, and a push rod 123 operate in a manner similar to their counterparts in the brake 8 described above. A front shell 116 is pre-formed (e.g., by pressing sheet steel), with a portion of the brake housing 112 being cast around a portion of the front shell 116.

In this case, the brake 108 includes a parking brake portion 150 having a center piece 152 and a pressed steel rear shell 154. The center piece 152 is cast from aluminum and closes off the rear of the front shell 116 at a plane 170, in a manner similar to the way in which the rear shell 18 closes off the rear of the front shell 16 in FIG. 1. The structure for closing the rear may be conventional and is shown only schematically. The center piece 152 therefore acts as a closing component. The rear shell 154 includes a parking brake spring 156 that acts on a large piston 158. The large piston 158 includes a push rod 160 that acts on a piston 122 when the parking brake is applied in a known manner. To release the parking brake, pressurized air is fed via a port 160A into a region to the left of the large piston 158. This forces the diaphragm 158 to the right (in the orientation shown in FIG. 6), causing the parking brake spring 156 to compress. This compression pushes the push rod 160 to disengage the piston 122, thereby releasing the parking brake.

If the center piece 152 is cast from aluminum, it may be difficult to form a deformable rim on the center piece 152. Furthermore, where the front shell 116 is made from pressed steel, it is not possible to weld the front shell 116 to the aluminum center piece 152. Thus, it will be appreciated that the available connection techniques for connecting the front shell 116 to the center piece 152 are more limited. However, it will also be appreciated that it is still possible to crimp a portion of the front shell 116 onto the center piece 152. Furthermore, it is also possible to roll a rim of the front shell 116 onto the center piece 152. Clearly, any metal deforming techniques applied to the front shell 116 should be carried out after the brake housing 112 has been cast with the front shell 116.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An air brake actuator assembly, comprising:
   an air chamber component; and
   a brake housing, wherein a portion of the brake housing is cast around a portion of the air chamber component to form a mechanical joint.

2. An assembly according to claim 1, wherein the air chamber component has a substantially cylindrical body with one end of the substantially cylindrical body forming said portion of the air chamber component.

3. An assembly according to claim 2, wherein said portion of the air chamber component has a form-locking profile that engages within the brake housing during casting of the brake housing.

4. An assembly according to claim 3, wherein the form-locking profile comprises a flange on the air chamber component.

5. An assembly according to claim 4, wherein the flange is directed in a radially inward direction.

6. An assembly according to claim 5, wherein the flange is continuous.

7. An assembly according to claim 3, wherein said form-locking profile comprises a plurality of openings formed in said air chamber component.

8. An assembly according to claim 3, wherein said form-locking profile includes an outwardly-directed bulge.

9. An assembly according to claim 8, wherein the outwardly-directed bulge is discontinuous.

10. An assembly according to claim 8, wherein the outwardly-directed bulge is continuous around a circumference of the air chamber component.

11. An assembly according to claim 1, wherein the air chamber component comprises a front shell, and wherein the assembly further comprises a closing component fixed to the front shell by a fastener to form an air chamber.

12. An assembly according to claim 11, wherein the fastener comprises at least one deformed portion of the front shell.

13. An assembly according to claim 11, wherein the front shell is a pressed steel front shell.

14. An assembly according to claim 1, wherein the air chamber component comprises a front shell and wherein the assembly further includes a parking brake having a center piece that closes the front shell,
   wherein the center piece is fixed to the front shell by a fastener to form an air chamber in the air chamber component.

15. An assembly according to claim 14, wherein said fastener comprises at least one deformed portion of the front shell.

16. A method of manufacturing a brake assembly, comprising:
   locating a portion of an air chamber component in a mold;
   filling the mold with molten material to cast a brake housing; and
   allowing the molten material to solidify in the mold to join the air chamber component to the brake housing to form the brake assembly.

17. A method according to claim 16, further comprising the step of chilling the air chamber component before the filling step.

18. A method according to claim 16, further comprising the step of securing the air chamber component to a closing component by deforming a region of the air chamber component.

* * * * *